Jan. 28, 1936.   H. S. MORRISON   2,028,944
TOASTING MACHINE
Filed June 20, 1929   3 Sheets-Sheet 1

INVENTOR.
Harry S. Morrison.
BY Barlow & Barlow
ATTORNEYS.

Jan. 28, 1936.  H. S. MORRISON  2,028,944
TOASTING MACHINE
Filed June 20, 1929  3 Sheets-Sheet 2

INVENTOR.
Harry S. Morrison.
BY Barlow & Barlow
ATTORNEYS.

Jan. 28, 1936.  H. S. MORRISON  2,028,944
TOASTING MACHINE
Filed June 20, 1929  3 Sheets-Sheet 3
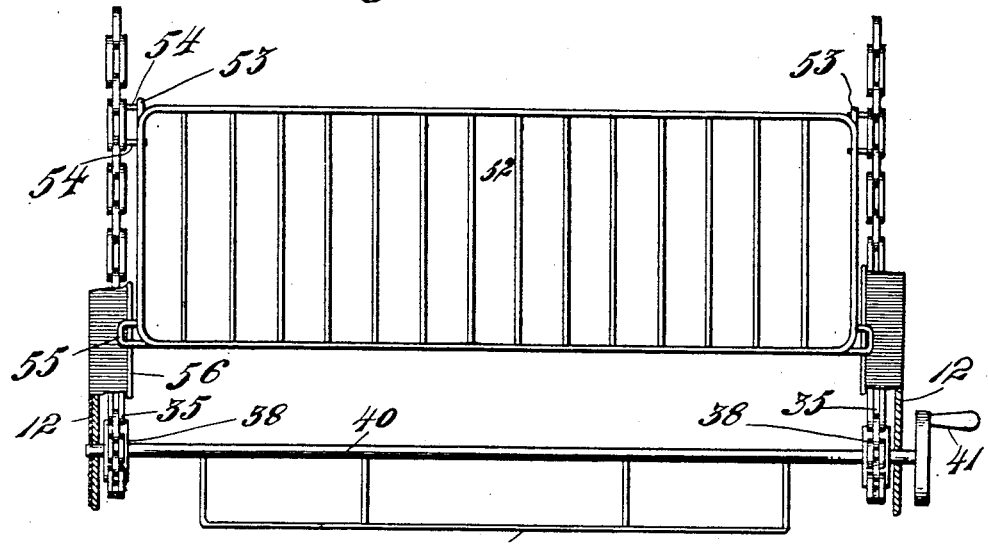
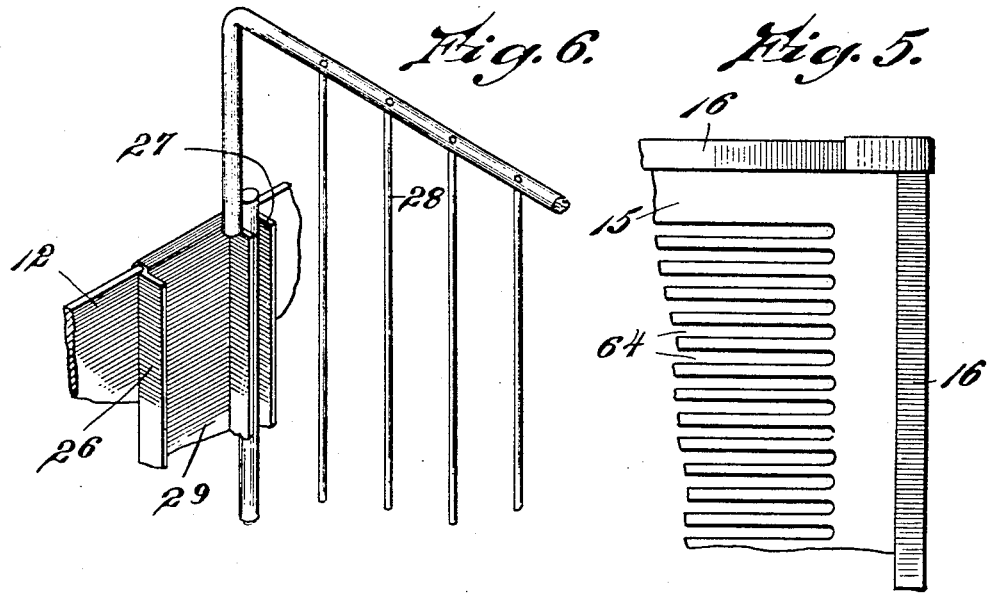
INVENTOR.
Harry S. Morrison.
BY Barlow Barlow
ATTORNEYS.

Patented Jan. 28, 1936

2,028,944

UNITED STATES PATENT OFFICE 2,028,944

TOASTING MACHINE

Harry S. Morrison, Auburn, R. I., assignor, by mesne assignments, to Republic Metalware Company, Buffalo, N. Y., a corporation of New York Application June 20, 1929, Serial No. 372,242

20 Claims. (Cl. 53—5)

This invention relates to toasting machines of the type in which slices of bread are deposited in an endless carrier and conveyed through a heated zone for toasting.

An object of the invention is to provide a toasting machine wherein the slices of bread are carried on an endless conveyor through an oven divided vertically, the direction of travel being such that the bread enters the top of the oven having the greatest amount of heat and then passes vertically downward therethrough.

Another object is to provide a toasting machine of large capacity having a divided oven and in which means are provided for cooling the portion of the machine surrounding the oven.

Another object is to provide a toasting machine in which the depositing of the slices of bread is performed with the greatest ease and facility and the toast is automatically discharged at the completion of the toasting operation.

Another object is to produce an efficient, strong and durable toasting machine which may be economically constructed and operated.

With these and other objects in view, the invention consists of certain novel features of construction, as will be more fully described, and particularly pointed out in the appended claims.

In the accompanying drawings:

Figure 5 is a fragmentary plan of one corner of the top of the machine, showing the ventilating louvres;

Figure 6 is a detail perspective of the center grating and its supporting means; and Figure 7 is a fragmentary front elevation, partly in section, showing one of the baskets in loading position.

Figure 1:
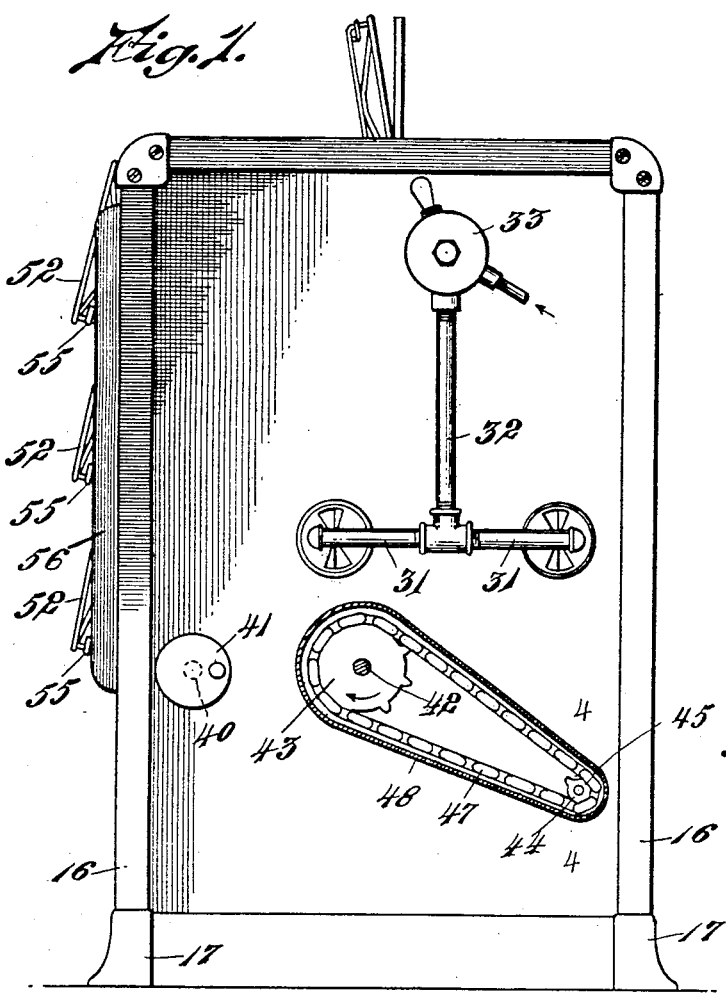
Figure 1 is an elevation of one end of a toasting machine constructed according to my invention.

It is found in the practical operation of toasting machines of the character shown herein, of advantage to convey the slices of bread downwardly through a divided oven so that the bread will initially enter the hottest part of the oven; and it is also found of advantage to provide an oven which is so constructed and arranged within a casing that the loss of heat from the oven will be reduced to a minimum and the heat which may be given off by the oven will be quickly carried off by currents of air circulated through the casing exteriorly of the oven; and furthermore, it is found of advantage to provide a carrier for the slices of bread with loosely mounted baskets which are adapted to assume a number of positions while traveling through the machine and to automatically dump the toast therefrom when the baskets emerge from the oven; and the following is a detailed description of one construction by which these advantageous results may be accomplished:—

With reference to the drawings, the machine comprises a casing formed of any suitable material for inclosing the operating mechanism. Preferably, the front wall 11 of the casing is set back from the front edges of the side walls 12, the upper portion of the front wall being inclined rearwardly, as indicated at 13. The front and side walls, as well as the rear wall 14 and top 15 are formed from sheet metal, which is attached to a skeleton frame 16 formed from angle iron. The bottom of the frame 16 extends below the walls to provide legs 17 for supporting the machine on a table or the like.

Mounted within the casing to the rear of the front wall 11 and forwardly of the rear wall 14 is an oven 18 formed of fire brick or any other suitable material. The oven is divided along its center so as to permit the passage of the bread being toasted therethrough, and therefore, the oven preferably comprises a front wall 19, the upper part of which is inclined rearwardly, as indicated at 20, and the upper edge of which terminates at a distance below the top of the casing and receives an angular extension 21 of the front wall 11, and a rear wall 22 which is formed similarly to the front wall, having its upper portion inclined forwardly, as indicated at 23 and terminating at the top 15. The construction is such that the top of the oven has a relatively narrow mouth through which the bread passes upon entering the oven.

The oven is supported on a plate 24 carried by the side walls 12. This plate is divided into two sections and along the inner adjoining edges thereof are sheets of asbestos 25 or other suitable non-heat-conducting material. These sheets are spaced apart a distance equal substantially to the width of the mouth of the oven.

Each of the side walls 12 has a vertical guide 26 mounted thereon in the space between the divided parts of the oven. The guides are preferably made from sheet metal shaped to provide a relatively narrow channel 27 for receiving a wire grating 28, and a comparatively wide channel 29 for the bread carrier and its associated parts.

Mounted within the oven and disposed adjacent to the walls 19 and 22 thereof, are heating elements 30, preferably composed of vertical gas radiants, to which the fuel is supplied by conduits 31 and 32. On the conduit 32 there is placed a control valve 33 which is thermostatically operated by a suitable rod 34 extending into the oven.

The slices of bread to be toasted are adapted to be conveyed from the front of the machine across the forward top portion and into the mouth of the oven at its hottest part, passing downwardly therethrough and out of the bottom.

For this purpose I have provided a carrier comprising sprocket chains 35 which are disposed within the casing adjacent each of the walls 12. These chains are carried on rollers 36 and 37 in the top of the casing, and sprockets 38 and 39 near the bottom of the casing. The rollers 36 and sprockets 38 are disposed adjacent to the front of the casing, while the rollers 37 and sprockets 39 are so disposed that the chains 35 will travel in the channels 29 of the guides 26.

The sprockets 38 are mounted on a shaft 40 journaled in the walls 12. One end of this shaft carries a crank 41 so as to permit manual operation of the carrier when so desired. On the other hand, the sprockets 39 are mounted on a shaft 42 journaled in the walls 12. On one end of the shaft 42 there is a sprocket 43 which is connected to a sprocket 44 on the end of the shaft 45 of an electric motor 46 by a chain 47, these parts being suitably enclosed in a housing 48.

Figure 4:
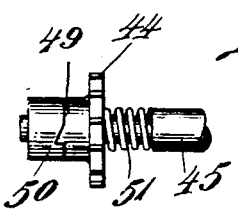
Figure 4 is a detail of the sprocket clutch.

For the purpose of preventing operation of the carrier by power from the motor 46 should the parts become disarranged or jammed through any cause, the sprocket 44 is not keyed directly to the shaft 45, but has a clutch face 49 for engaging the correspondingly formed face on a collar 50 mounted on the end of the shaft. The face of the sprocket is held in engagement with the face of the collar by means of an expansible spring 51. These parts will remain engaged unless the force applied through the chain 47 to the sprocket exceeds the force transmitted through the collar to the sprocket, whereupon the parts will separate, in the manner clearly shown in Figure 4, thereby permitting continued rotation of the motor shaft without such rotation being transmitted to the carrier.

The chains 35 carry a plurality of baskets 52, each of which is adapted to receive a number of slices of bread. In the form shown, the baskets are constructed from wire bent to provide a bottom and four sides. At opposite corners along one edge of each basket, the wire is bent to provide elongated eyes 53 through which are inserted pins 54 projecting inwardly from the links of the chains 35. At the other two opposite corners of each basket, the wire is bent to form laterally extending fingers 55, the purpose of which will be presently described. As shown, the eyes 53 are disposed in a plane paralleling the sides of the baskets, while the fingers 55 are disposed in a plane paralleling the bottom of the baskets, whereby the eyes 53 will be disposed in a plane at right angles to the fingers 55, the disposition of the eyes 53 being such as to permit the baskets to swing outwardly from the chains 35, as will be readily understood. In the accompanying drawings, some of the baskets have been omitted from the carrier, for sake of clearness.

The construction and arrangement of the parts is such that when the baskets 52 are in a position to be loaded with the slices of bread, the fingers 55 engage with the outer surface of guide bars or tracks 56 vertically disposed on the front of the casing, so that the baskets will be disposed at a slight angle to the front of the casing, and when the baskets are within the oven, they will move downwardly in a vertical path, the grating 28 preventing the slices of bread from falling from the baskets.

Figure 3:
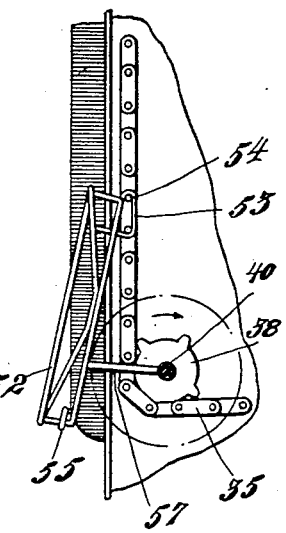
Figure 3 is an enlarged detail view of a portion of the structure shown in the lower left hand corner of Figure 2 illustrating the manner of lifting one of the baskets on to the guide bars.

For the purpose of lifting the baskets on to the tracks 56 the shaft 40 has an arm 57 projecting therefrom. This arm is so disposed on the shaft, and the baskets are so spaced on the chains that as a basket moves past the sprockets 38, the arm 57 moves into contact with the bottom of the basket and swings the same outwardly, in the manner clearly shown by Figure 3, whereupon the fingers 55 will rest on the tracks 56.

As shown, the top of the grating 28 is offset slightly forwardly to provide a step for engaging the top of the channel 27 to support the grating. The upper portion of the gating should project a suitable distance above the top of the machine, so as to intercept any slices of bread which may tend to fall from the baskets when the latter swing downwardly to enter the oven.

When the baskets emerge from the bottom of the oven they immediately fall away from the chains 35, and this action precipitates the toast onto an inclined plate 59 which is mounted in the bottom of the casing for the purpose of deflecting the toast towards the front of the machine.

Figure 2:
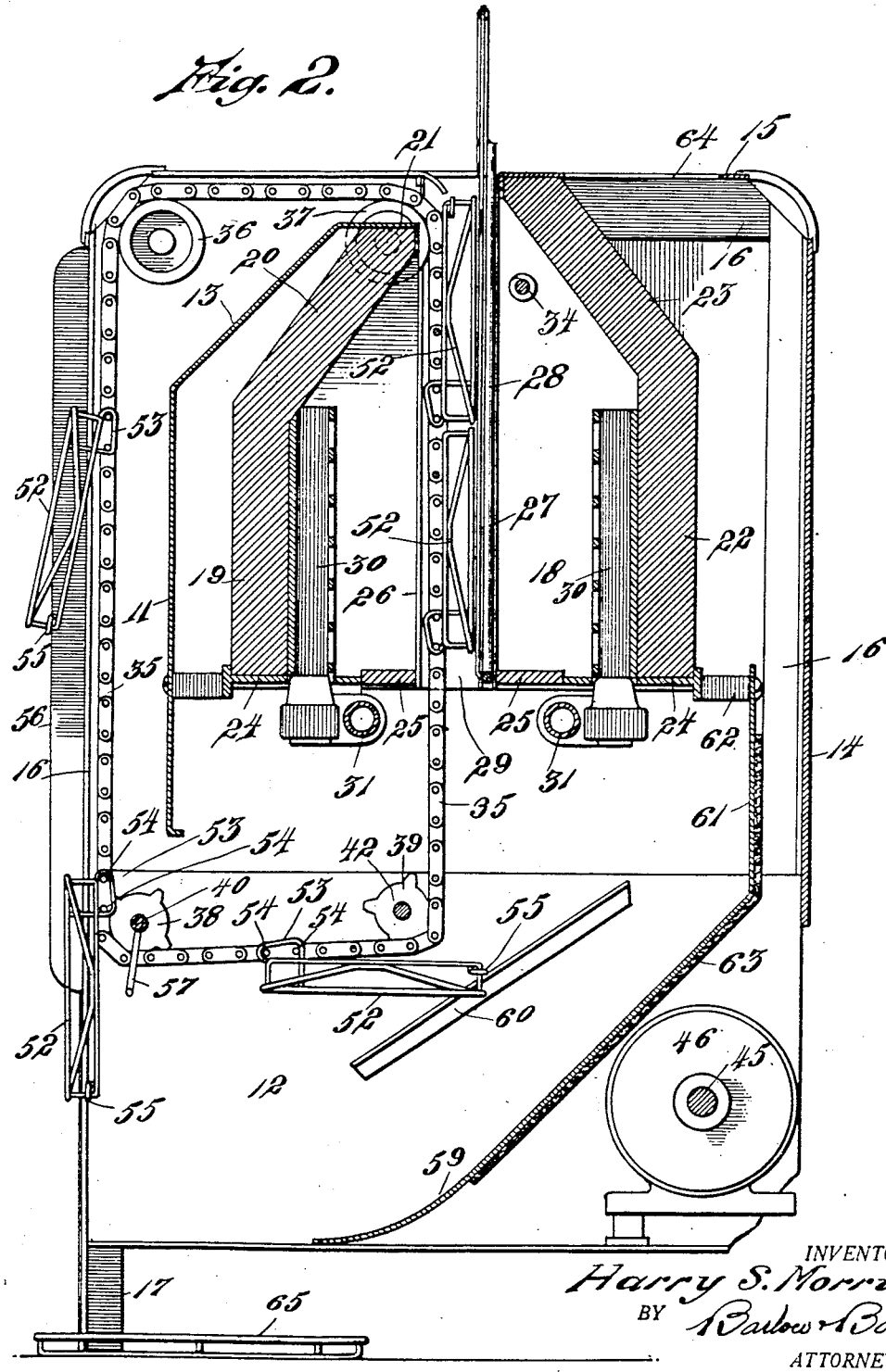
Figure 2 is a vertical transverse section of the machine, some of the baskets being omitted.

Between the sprockets 39 and the plate 59, the side walls 12 carry inclined tracks 60, formed from angle iron or the like, and are adapted to receive the fingers 55 and thereby support the free edge of the baskets as the same move around the sprocket 39 (see Figure 2).

The plate 59 has an upwardly extending portion 61 that is disposed to the rear of the wall 22 of the oven. This portion of the plate is also spaced a suitable distance in front of the rear wall 14 of the casing. The upper edge of the plate is fixed to a bracket 62 formed as an extension of the plate 24. One side of the plate 59 may carry a sheet of asbestos 63, or other heat insulating material. In this way the plate divides the portion of the casing containing the motor 46 from the portion in which the toast is deposited. As shown, the lower portion of the plate 59 is curved slightly so as to direct the toast deposited on the plate into a basket 65 positioned beneath the bottom of the machine near the front thereof.

The drive of the machine by the motor may be manually supplanted at any time by means of the crank handle 41 by which the speed of the carrying chain may be increased through disconnection of the clutch 49, 50 and the slices will not be browned to such an extent.

In order to permit the escape of heat from the rear portion of the casing, the top 15 is provided with louvres 64, or the like. During the operation of the machine, currents of air will flow upwardly through the casing on both sides of the plate 59 and out through the louvres in the top 15, thereby dispelling the heat given off by the motor, as well as the heat given off by the toast. It will be also understood that the insulator 63 will prevent any excess of heat from the motor being transmitted to the toast on the other side of the plate 59, or vice versa any excess of heat from the toast being transmitted to the motor. Furthermore, the disposition of the front wall 11 with respect to the front of the oven is such that heat will not accumulate at the front of the machine, but will readily pass off through the open top above the inclined portion 13 of the front wall.

From the foregoing it will be seen that the invention provides a toasting machine which accomplishes many desired results in a simple and satisfactory manner.

The foregoing description is directed solely towards the construction illustrated, but I desire it to be understood that I reserve the privilege of resorting to all the mechanical changes to which the device is susceptible, the invention being defined and limited only by the terms of the appended claims.

The invention claimed is:—

1. A toasting machine comprising a casing, a vertically divided oven within the casing, heating elements within the oven, endless carrier means mounted in the casing and having its upward pass entirely exposed at the front of the machine for loading the same, and guides for engaging said carrier means while passing vertically through the said oven.

2. A toasting machine comprising a casing, a vertically divided oven within the casing, heating elements within the oven, an endless carrier mounted in the casing and having its upward pass entirely exposed at the front of the machine for loading the same, channel-shaped means for guiding the carrier through said oven, means for moving said carrier in a direction downwardly through the oven and between the heating elements thereof, and individual slice holders carried by the endless carrier.

3. A toasting machine comprising a casing, a vertically divided oven within the casing, a pair of spaced-apart heating elements within the oven, endless chains mounted in the casing and guided through said oven and having their upward passes entirely exposed at the front of the machine for loading the same, means for moving the chains in a direction downwardly through the oven and between the heating elements thereof, and a plurality of baskets connected to the said chains.

4. A toasting machine comprising a casing, an oven within the casing heating means for the oven, the oven being formed with a vertical centrally arranged toasting space, endless chain means for conveying the bread downwardly through the toasting space of the oven the upward pass thereof being exposed over its entire length for loading and the downward pass traveling through the toasting space, and individual slice holders carried by the endless chains.

5. A toasting machine comprising a casing having front, side and end walls, an oven, said oven being divided vertically into two sections, heating elements in each of the oven sections, a compound channel on each of the said side walls, said channels being positioned between the two sections of the oven, a grating mounted in one of the channels, endless chains movably guided in the other of the said channels and encircling one of the oven sections, and wire baskets connected to the said chains, said baskets having an open top which is closed by the said grating when the baskets are in the oven.

6. A toasting machine comprising a casing having front, side and rear walls, an oven mounted within the casing and spaced from the front and rear walls thereof, said oven being divided vertically into two sections, means for heating the oven, an endless carrier mounted in the casing, said carrier encircling one of the oven sections and the said front wall, driving means for the carrier including an electric motor mounted within the casing beneath the said oven, a slotted plate covering the rear portion of the top of the casing to permit the upward flow of air currents through the space at the back of the casing, and a plate between the bottom of the oven and the said motor, said plate being insulated for protecting the said motor from the heat of the said oven.

7. A toasting machine comprising a casing, an oven within the casing, the oven being formed with a vertical, centrally arranged toasting space, heating elements within the oven and arranged one on each side of the toasting space, endless carrier means mounted within the casing and passing through the toasting space, carrier baskets mounted upon the carrier means, and vertical guides engaging the baskets while the baskets are passing through the toasting space of the oven.

8. A toasting machine comprising a casing, an oven within the casing and in interspaced relation with the back wall of the casing, a plate having louvers covering the space between the oven and the rear wall, heating means for the oven, an endless toast carrier mounted within the casing for passage through the oven, means including an electric motor for driving the carrier, and an inclined plate having its upper end supported within the space between the oven and the rear wall of the casing and extending downwardly and forwardly over the motor and under the oven, whereby heated air below the oven is deflected upwardly through the louvers.

9. A toasting apparatus which comprises an endless chain in a vertical plane, baskets mounted at spaced intervals on said chain in said plane to carry slices of material to be toasted, one end of each of said baskets being fastened to the chain and open at the ends opposite to their attachment to said chain, and heaters at opposite sides of said baskets in a part of their path of travel, said chain being positioned to hold the open end of each basket uppermost prior to the passage of said basket between said heaters.

10. A toasting apparatus which comprises an endless chain in a vertical plane, baskets mounted at spaced intervals on said chain and attached thereto in said plane to carry slices of material to be toasted; said baskets being open at the ends opposite to their attachment to said chain, and heaters at opposite sides of said baskets in a part of their path of travel, said chain being positioned to hold the open end of each basket downwardly after its passage from between said heaters.

11. In a toaster, the combination with a pair of vertically extending heaters, a chain adapted to be moved between said heaters, a plurality of narrow, flat open ended baskets carried by said chain, said baskets being secured to the chain so that they are carried between the heaters with the narrow surfaces advancing, and the broad surfaces presented to the heaters.

12. A toasting machine comprising a casing having front, side, and rear walls, an oven mounted within the casing and spaced from the front and rear walls thereof, means for heating the oven, an endless carrier mounted within the casing and passing vertically through the oven, said front wall of the casing being joined to the top of the oven, the front portion of the top of the casing being open, and a slotted plate covering the rear portion of the top of the casing, whereby air may be circulated within the space between the oven and the rear wall.

13. A toasting apparatus which comprises an endless chain a part of which is arranged in a vertical plane, baskets mounted at spaced intervals on and attached to said chain to carry slices of material to be toasted, said baskets being open at the ends opposite their attachment to said chain, and heaters at opposite sides of said baskets in a part of their path of travel.

14. A toasting apparatus which comprises an endless chain a part of which is arranged in a vertical plane, baskets mounted at spaced intervals on said chain to carry slices of material to be toasted, one side of each of said baskets being fastened to the chain and open at the end opposite to its attachment to the chain, and heaters at opposite sides of said baskets in a part of their path of travel, said chain being positioned to hold the open side of each basket uppermost prior to the passage of said baskets between said heaters.

15. A toasting apparatus which comprises an endless chain a part of which is arranged in a vertical plane, baskets mounted at spaced intervals on said chain and attached thereto to carry slices of material to be toasted, said baskets being open at the sides opposite to their attachment to said chain, and heaters at opposite sides of said baskets in a part of their path of travel, said chain being positioned to hold the open side of each basket downwardly after its passage from between said heaters.

16. A toasting apparatus which comprises an endless chain a part of which is arranged in a vertical plane, baskets mounted at spaced intervals on said chain and attached thereto to carry slices of material to be toasted, said baskets being open at the sides opposite to their attachment to said chain, heaters at opposite sides of said baskets in a part of their path of travel, said chain being positioned to hold the open side of each basket downwardly after its passage from between said heaters, and a receiver to receive the discharged slices of toast.

17. A toasting apparatus comprising a pair of spaced heaters having their heating surfaces arranged in substantially vertical planes, a chain having a portion thereof lying between the planes of said heaters, and slice carrying baskets carried in spaced succession on said chain, and secured thereto at one side, said baskets being open at the side opposite the side of their attachment to said chain.

18. In a toaster, the combination with a pair of vertically extending heaters, a chain having a portion thereof lying between the planes of the heating surfaces of the elements, a plurality of narrow, flat open-sided baskets carried by said chain, said baskets being secured to the chain so that they are carried between the heaters with the narrow surfaces advancing, and the broad surfaces presented to the heaters.

19. A toasting apparatus which comprises a pair of spaced, upwardly extending heating elements, flat slice supporting baskets each having an open side, means for carrying said baskets upwardly with their narrow sides advancing, thence along a path which changes the direction of chain travel substantially 180° to a downward direction, thence downwardly between said heaters with their broad, flat sides exposed thereto, and thence through a path which reverses the chain travel substantially 180°.

20. A toasting apparatus which comprises a pair of spaced, upwardly extending heating elements, flat slice supporting baskets each having an open side, means for carrying said baskets upwardly with their narrow sides advancing, thence along a path which changes the direction of chain travel substantially 180° to a downward direction, thence downwardly between said heaters with their broad, flat sides exposed thereto, and thence through a path which reverses the chain travel substantially 180°, and a receiver for said toasted slices below said reverse path of the baskets.

HARRY S. MORRISON.